United States Patent [19]
Renfro

[11] 3,947,995

[45] Apr. 6, 1976

[54] SOD SEEDLING GROWING APPARATUS

[75] Inventor: John C. Renfro, Dana Point, Calif.

[73] Assignee: Renfro Development Corporation, Dana Point, Calif.

[22] Filed: Mar. 21, 1975

[21] Appl. No.: 560,692

[52] U.S. Cl................... 47/34 R; 47/56; 30/124
[51] Int. Cl.².................. B26D 1/00; A01G 9/02
[58] Field of Search............... 47/34, 32–33, 47/1, 37, 56; 30/124

[56] References Cited
UNITED STATES PATENTS

| | | | |
|---|---|---|---|
| 2,814,161 | 11/1957 | Hawkins | 47/34 X |
| 3,529,380 | 9/1970 | Carmichael | 47/33 |
| 3,543,437 | 12/1970 | Gaines | 47/34 |

Primary Examiner—Robert E. Bagwill

[57] ABSTRACT

A first frame capable of holding humus in which seeds of a plant are embedded to obtain the rapid germination of the seeds, with the first frame being supported on a second frame in which fertile soil is contained. The seedlings resulting from the germination of the seeds have roots that extend downwardly into the soil in the second frame. The first frame has manually operable means mounted thereon for severing the seedling roots in the first frame from those in the second frame to permit the two frames to be separated. The sod seedlings are removed from the first frame and the sod then planted in the field. The apparatus is particularly well adapted for producing sod seeding plantings.

3 Claims, 8 Drawing Figures

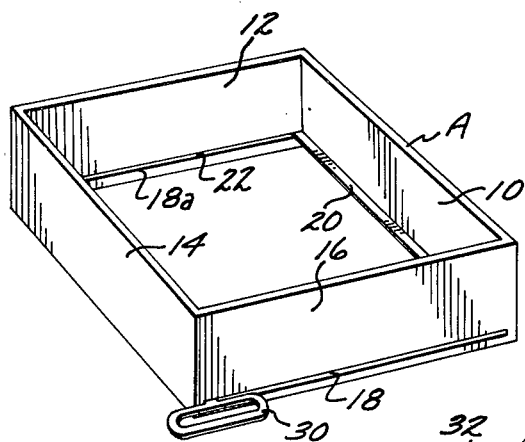
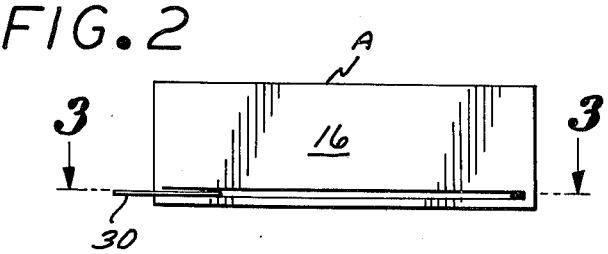
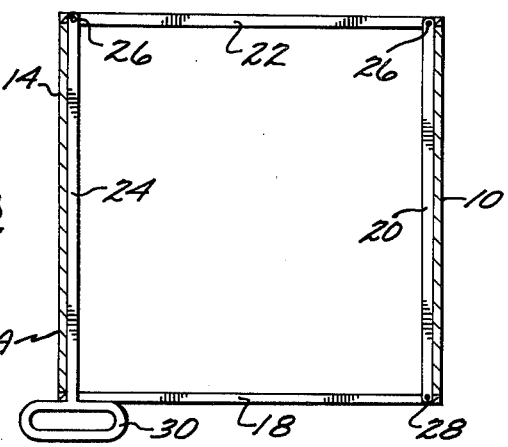
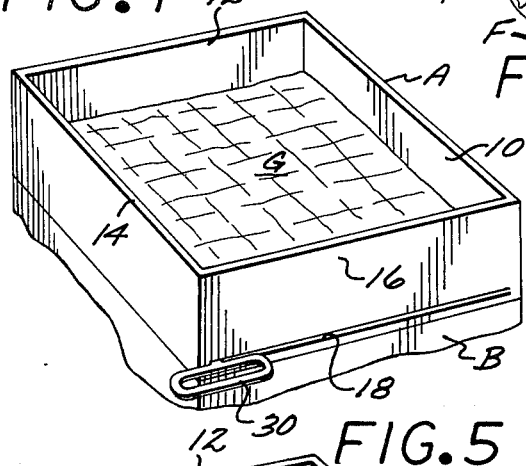
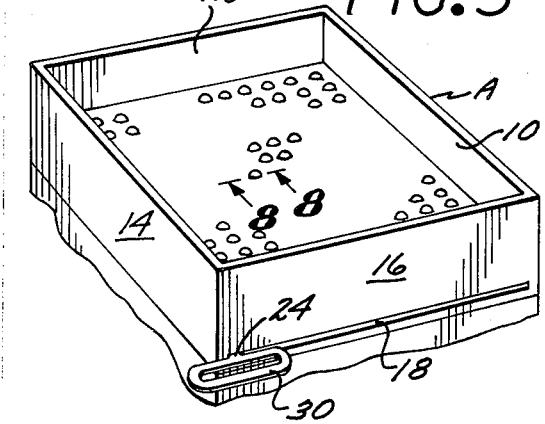
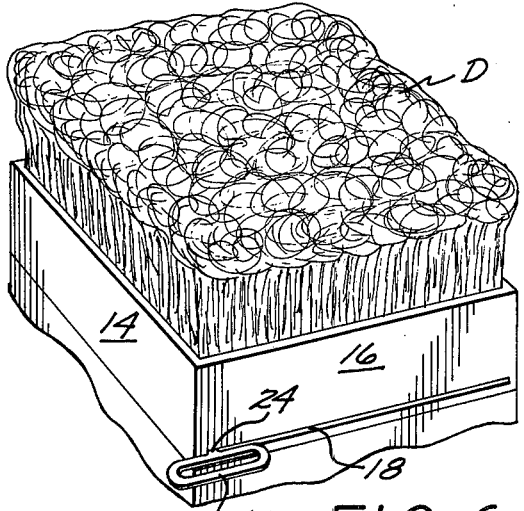
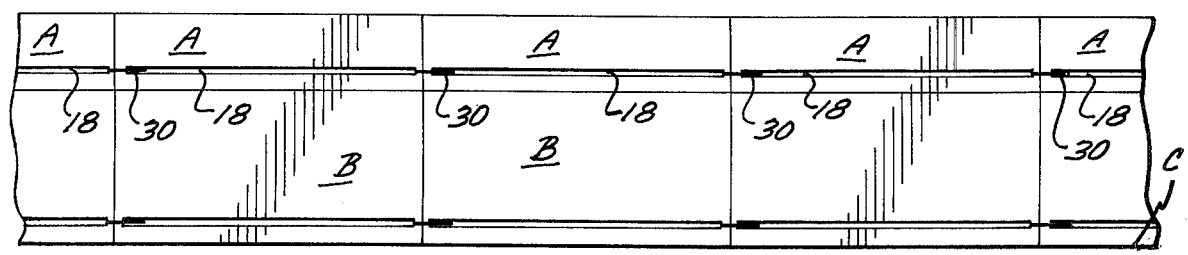

SOD SEEDLING GROWING APPARATUS

BACKGROUND OF THE INVENTION

1. Field of the Invention

Sod seedling growing apparatus.

2. Description of the Prior Art

In the use of the present invention, the alfalfa seeds are first treated with an aqueous legume bacteria solution. Balls of humus the size of small marbles are formed, with each ball containing two or three alfalfa seeds. The seeds in such balls germinate rapidly when the balls are embedded in spaced relationship in humus that is moist and exposed to a warm temperature.

Rapid germination of the seeds in the balls of humus is achieved by placing the balls at uniformly spaced positions in a bed of humus that is contained in a first frame that is the subject of the present invention, with the first frame resting on a second frame or trough containing a fertile soil into which roots from alfalfa seedlings may extend. The first frame is provided with a manually operable linkage mechanism, which when moved from a first to a second position, serves to sever that portion of the seedling roots in the first frame from those root portions in the second frame. After severance of the root portions, the sod seedlings in the first frame that are now of a desired height are then removed from the first frame and planted in a field. The linkage mechanism is then moved to the first position where the first frame may again be used for the purpose above described.

SUMMARY OF THE INVENTION

A generally square first frame of substantial height is provided defined by first, second, third and fourth connected side pieces of substantial height having upper and lower edges when the frame is disposed as shown in FIG. 1. The fourth side piece, adjacent the lower edge thereof, has a longitudinal slot formed therein. First, second and third pivotally connected elongate root cutting blades are disposed within the first frame adjacent the interior surface of first, second and third side pieces and lying in a plane common to that of the longitudinal slot. The free end of the first blade is pivotally connected to the interior of the first frame adjacent the intersection of the first and fourth side pieces. When so disposed, the blades are in a first position. The third blade is of sufficient length that an end portion thereof projects forwardly from the first frame and has a handle secured thereto. The first frame is rested on a second frame or trough that contains a fertile soil. The first is now at least partially filled with humus, with the blades being in the first position. A number of balls of humus are then disposed on a sheet of rigid material, and in engagement with spaced holes in the sheet which are sufficiently small that the balls will not readily pass therethrough. The sheet is of such size as to be slidably inserted in the first frame to rest on the upper surface of the humus therein. Each ball of humus contains two or three alfalfa seeds that have been previously treated with an aqueous legume bacteria solution. A board is then brought into pressure contact with the balls to force them downwardly through the openings in the sheet to become embedded in spaced relationship in the humus contained in the first frame.

The sheet and board are then removed from the first frame, and if necessary, additional humus added to the interior of the first frame to cover the humus balls with a layer of humus approximately three-quarters of an inch in depth. The first frame is then subjected to an environment suitable for the rapid germination of the alfalfa seeds. After the alfalfa seeds have germinated and the resulting seedlings grown to a desired height, the handle of the first frame is grasped and drawn outwardly to dispose the first, second and third blades are in a second position where they are in longitudinal alignment.

In moving from the first to the second position, the first, second and third blades sever the roots of the seedlings which extend from the first frame into the soil in the second frame or trough. Sod seedlings are then removed from the first frame and planted in spaced relationship in a field. The first, second and third blades are then returned to the first position, whereupon the first frame may again be used for the purpose above described.

BRIEF DESCRIPTION OF THE DRAWING

FIG. 1 is a perspective view of the sod seedling growing apparatus;

FIG. 2 is a front elevational view of the apparatus shown in FIG. 1;

FIG. 3 is a transverse cross-sectional view of the apparatus, taken on the line 3—3 of FIG. 2;

FIG. 4 is a perspective view of the apparatus partially filled with humus;

FIG. 5 is another perspective view of the apparatus, with a rigid sheet disposed therein, in which openings are formed to hold a number of balls of humus containing alfalfa seed in spaced relationship;

FIG. 6 is a further perspective view of the apparatus after the rigid sheet has been removed and the balls of humus containing the seed have resulted in the germination of the latter, and the subsequent growth of seedlings fo a desired height;

FIG. 7 is a front elevational view of a number of the devices shown in FIG. 1 disposed in side-by-side relationship and resting on second device of a like nature, or an elongate trough that is filled with a fertile soil; and FIG. 8 is a fragmentary, cross-sectional view of the rigid sheet shown in FIG. 5, and taken on the line 8—8 thereof to illustrate the manner in which one of the balls of humus containing alfalfa seeds is held in spaced relationship on the card prior to placement of the board in pressure contact with the ball to force the latter downwardly through an opening in the cardboard into an embedded position in the humus contained within the apparatus.

DESCRIPTION OF THE PREFERRED EMBODIMENT

Each of the first frames A, as best seen in FIGS. 1, 2, and 3, include first, second, third and fourth side pieces 10, 12, 14, and 16, respectively. The first, second, third and fourth side pieces 10, 12, 14 and 16 are preferably formed from wood, are of equal length, and are secured at their adjoining ends by conventional means (not shown).

The first, second, third and fourth side pieces 10, 12, 14 and 16 are of substantial depth, with six inches being suitable when the side pieces are substantially three feet in length. The fourth side piece 16 preferably has a longitudinal slot 18 formed in the lower portion thereof, as can best be seen in FIG. 1. A second longitudinal slot 18a may be formed in the second end piece 12 if desired, which lies in the same plane as the slot 18.

First, second and third elongate root-cutting blades 20, 22 and 24, respectively, are provided, as can best be seen in FIG. 3, the adjoining ends of which blades are pivotally connected by pins 26. A pin 28 is disposed in the right end portion of the slot 18, as viewed in FIG. 3, and pivotally supports the free end of the first blade 20. The first and third blades 20 and 24 are of such length that when adjacently disposed relative to the first and third end pieces 10 and 14, the second elongate blade 22 is at least partially located in the second slot 18a. The free end of the third blade 24, as may best be seen in FIG. 3, has an elongate handle 30 secured thereto by conventional means (not shown). When the first, second and third blades 20, 22, and 24 are in the first position illustrated in FIG. 3, the handle 30 is adjacently disposed relative to the external surface of a fourth side piece 16. Positioning of the second blade 22 in slot 18a maintains the first, second and third blade 20, 22 and 24 in a common plane when they are in a first position.

The frames A, as can best be seen in FIG. 7, rest in side-by-side relationship on the upper surfaces of second frame B or an elongate trough which is filled with fertile soil (not shown). When the first frames A are disposed on the second frame or trough B, the first frames are filled with humus material to within an inch or so of the top thereof. The second frames B or tough rest on the ground surface C, as shown in FIG. 7.

When the first frames A are to be used in growing alfalfa seedlings D, shown in FIG. 6, a number of balls E of humus are formed that are the size of small marbles, each of which balls has two or three alfalfa seeds F embedded therein which have previously been treated with an aqueous legume bacteria solution. The balls E are dried to have substantial rigidity.

A rigid sheet 32 is provided, as may be seen in FIG. 5, that has a number of spaced openings 34 formed therein, which openings are of such size that the balls E will only pass downwardly therethrough when subjected to pressure. The cardboard sheet 32 bearing the balls E may be slid downwardly within the frame A shown in FIG. 4 to overlie the humus G contained therein. With the cardboard sheet 32 resting on the humus G, a board (not shown) is pressed downwardly onto the balls E to force the balls E through the openings 34 into the humus G, with the balls then being disposed in embedded spaced relationship in the humus.

An additional layer of humus G may be disposed over the embedded balls E, if desired. The frame A is then subjected to an environment that is of such temperature and humidity that the seeds F will germinate in as short a time as possible, with the germination of the seeds F resulting in the subsequent development of the alfalfa seedlings D illustrated in FIG. 6. After the seedlings D have reached a desired height, the handle 30 may be grasped and drawn outwardly relative to the frame A to pivot the first, second and third elongate blade from the first position shown in FIG. 3 to a second position (not shown) in which the blades are longitudinally aligned.

As the first, second and third blades 20, 22 and 24 move from the first to the second position, the roots of the seedlings D which extend downwardly into the second frames or trough B are severed, to permit the first frame to have the seedlings removed therefrom. After removal from the first frame A, the seedlings D are then transferred to a field (not shown) in which they are transplanted in spaced relationship. After removal of the seedlings D, the first, second and third blades 20, 22 and 24 are returned to the first position illustrated in FIG. 3, where the frame A may be disposed in its original position and filled with humus. The second frames or trough B may have first, second and third blades (not shown) disposed therein that are pivotally connected and actuated by handles 30 as previously described to permit separation of roots growing in the second frames from that portion of the roots which extend downwardly below the ground surface C.

The use and operation of the invention has been explained in detail herein and need not be repeated.

I claim:

1. An apparatus for use in growing seedlings from seed embedded in humus contained in said apparatus when the latter rests on an open topped container in which fertile soil is disposed, which apparatus includes:
   a. a frame of substantial depth that is defined by a plurality of side pieces connected in end-to-end relationship, said frame being adapted to be removably supported in a horizontal position on top of said container whereby said frame can be substantially filled with humus wherein said seeds are embedded, with at least one of said side pieces having a first longitudinal slot formed therein that is disposed adjacent to said container when said frame rests thereon, with said slot having first and second ends;
   b. a plurality of elongate root-cutting blades that are pivotally connected in end-to-end relationship and when in a first position are disposed adjacent to the interior surfaces of said side pieces, with said blades lying in a plane substantially common to that of said slot, and with one of said blades having a first end portion that projects through said first end of said slot to the exterior of said frame;
   c. a handle secured to said first end portion of said blade; and
   d. means for pivotally connecting a free end of one of said blades to said frame adjacent said second end of said slot, said handle when grasped and pulled outwardly moving said blades from said first position to a second position wherein said blades are longitudinally aligned, with the movement of said blades from said first to said second position after said seeds have developed into seedlings severing the portion of the roots of said seedlings in said frame from those portions of said roots in said container to permit said frame to be separated from said container for the easy removal of said seedlings from said frame.

2. An apparatus as defined in claim 1 wherein said frame is substantially square and is defined by first, second, third, and fourth side pieces, with said fourth side piece having said first longitudinal slot therein, with said first and third side pieces being disposed in a position normal to said four side pieces, and said plurality of elongate root-cutting blades including first, second and third blades that are disposed adjacent to the interior surfaces of said first, second and third side pieces when said blades are in said first position.

3. An apparatus as defined in claim 1 wherein said seedlings are alfalfa that originate from seeds of alfalfa embedded within a plurality of balls of humus, and said apparatus further includes:

d. a sheet of pliable deformable material that has a plurality of spaced openings formed therein which engage said balls, but with said openings being of sufficiently small size that said balls will not move downwardly therethrough without force being applied to said balls, which sheet is of such size as to be adapted to be slid downwardly within the interior of said frame to rest on said humus, and with said balls being ejected downwardly through said openings to be embedded in spaced relationship in said humus when a downwardly directed force is applied to said balls, with said sheet being removed from said frame after said balls are embedded in said humus in said frame.

* * * * *